United States Patent
Rawlinson

(10) Patent No.: US 8,887,752 B2
(45) Date of Patent: Nov. 18, 2014

(54) FUEL STAGING SYSTEM

(75) Inventor: Neil Rawlinson, Kenilworth (GB)

(73) Assignee: Goodrich Control Systems (GB)

(*) Notice: Subject to any disclaimer, the term of this patent is extended or adjusted under 35 U.S.C. 154(b) by 1381 days.

(21) Appl. No.: 12/273,043

(22) Filed: Nov. 18, 2008

(65) Prior Publication Data

US 2009/0126802 A1    May 21, 2009

(30) Foreign Application Priority Data

Nov. 20, 2007   (GB) .................................. 0722669.9

(51) Int. Cl.

| | |
|---|---|
| *G05D 11/00* | (2006.01) |
| *F16K 31/12* | (2006.01) |
| *F23K 5/06* | (2006.01) |
| *F02C 7/228* | (2006.01) |
| *F23K 5/04* | (2006.01) |
| *F23D 23/00* | (2006.01) |
| *F02C 7/232* | (2006.01) |
| *F02C 9/34* | (2006.01) |

(52) U.S. Cl.
CPC . *F02C 7/228* (2013.01); *F23K 5/06* (2013.01); *F23K 5/04* (2013.01); *F23D 23/00* (2013.01); *F02C 7/232* (2013.01); *F02C 9/34* (2013.01)
USPC .............................................. 137/98; 251/31

(58) Field of Classification Search
USPC .............. 137/98, 597, 563, 100, 111, 118.01; 251/31
See application file for complete search history.

(56) References Cited

U.S. PATENT DOCUMENTS

| | | | | |
|---|---|---|---|---|
| 3,857,241 | A | * | 12/1974 | Lewis ............................. 60/243 |
| 4,175,383 | A | | 11/1979 | Smith |
| 4,327,763 | A | * | 5/1982 | Budzich .................... 137/115.07 |
| 4,938,022 | A | * | 7/1990 | Hirata et al. ..................... 60/426 |
| 4,945,723 | A | * | 8/1990 | Izumi et al. ...................... 60/426 |
| 5,048,394 | A | * | 9/1991 | McLevige et al. .............. 91/361 |
| 5,081,903 | A | * | 1/1992 | Wardle et al. ................... 91/361 |
| 5,442,922 | A | | 8/1995 | Dyer et al. |
| 5,809,771 | A | * | 9/1998 | Wernberg .................. 60/39.094 |
| 5,881,550 | A | | 3/1999 | Toelle |
| 6,484,510 | B2 | * | 11/2002 | Futa et al. ......................... 60/790 |
| 6,955,040 | B1 | | 10/2005 | Myers, Jr. et al. |

FOREIGN PATENT DOCUMENTS

| | | |
|---|---|---|
| GB | 1474909 | 5/1977 |
| GB | 1514166 | 6/1978 |
| GB | 2 002 852 | 2/1979 |

OTHER PUBLICATIONS

European Search Report dated Oct. 5, 2010.

* cited by examiner

*Primary Examiner* — Len Tran
*Assistant Examiner* — Chee-Chong Lee
(74) *Attorney, Agent, or Firm* — Cantor Colburn LLP

(57) ABSTRACT

A fuel staging system comprises a splitter valve arranged to split an input fuel stream into a pilot fuel stream and a main fuel stream, the splitter valve comprising a spool slidable within a bore, the spool and bore together defining first and second control chambers, the fluid pressures in which determine the position occupied by the spool, the system further comprising a control line which, in use, controls fuel delivery through a plurality of main burners, the fluid pressure in the control line being a combination of the fluid pressures in the first and second control chambers.

6 Claims, 2 Drawing Sheets

FUEL STAGING SYSTEM

Figure 1:
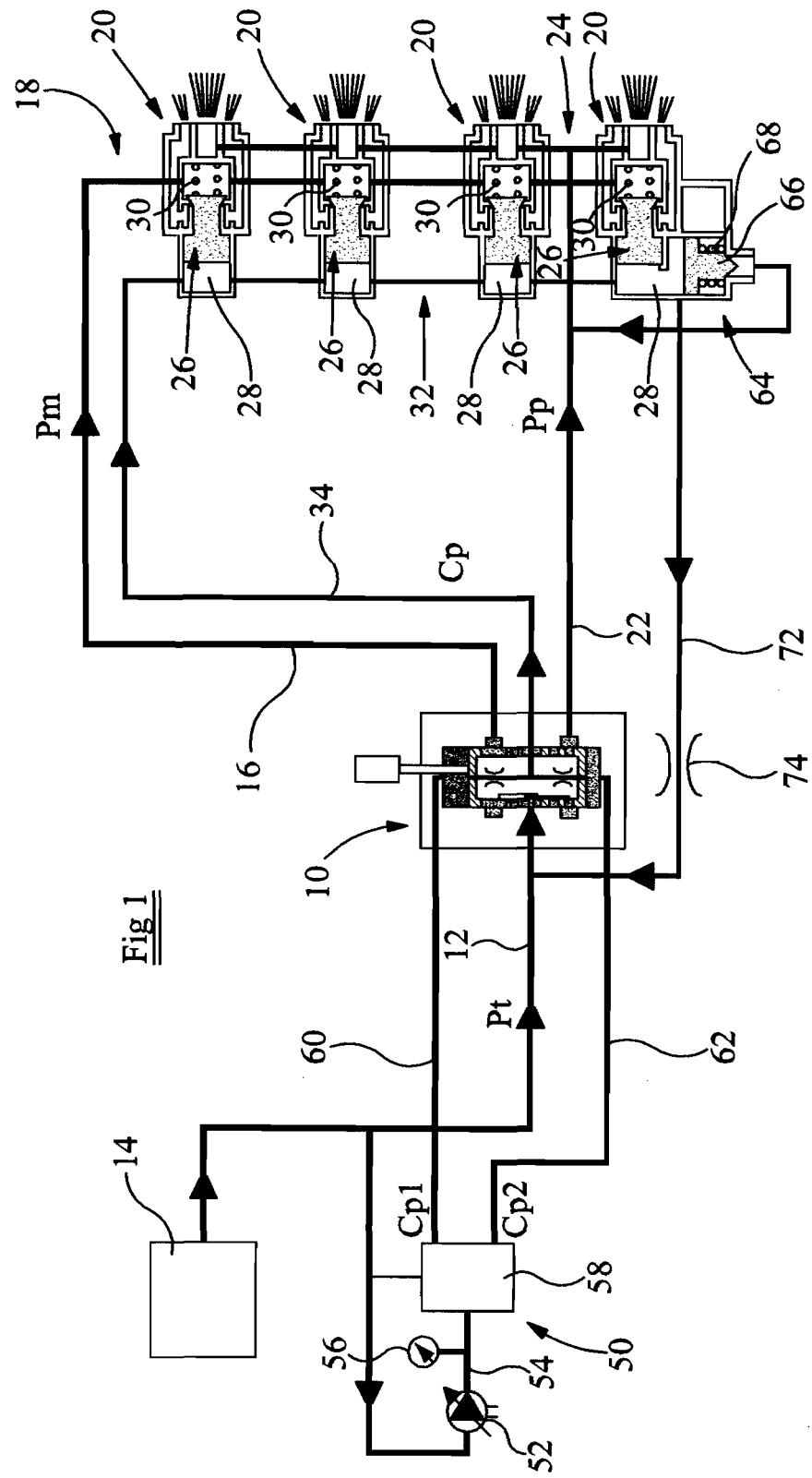

This invention relates to a fuel staging system, and in particular to a fuel staging system incorporating an electro-hydraulic control arrangement for controlling the splitting of fuel between main and pilot burners and the operation of main burner shut-off valves.

Fuel staging systems which control the delivery of fuel through pilot and main injection circuits are well known. Typically these are hydromechanically operated. Hydromechanical systems are relatively complex and the use of electro hydraulically actuated arrangements is becoming more common as they allow the fuel staging system to be of simpler form and avoid the use of some complex sealing arrangements. For example, U.S. Pat. No. 5,881,550 describes a fuel system in which a splitter valve is used to divide the fuel output from a fuel metering unit into a pilot fuel stream and a main fuel stream. The pilot fuel stream is supplied to the associated engines pilot burners whilst the main fuel stream is supplied through a shuttle valve to the main burners. The shuttle valve thus controls whether or not the main injectors receive fuel from the main fuel stream. A control valve operates to control the operation of the shuttle valve.

U.S. Pat. No. 6,955,040 describes an arrangement including separate pilot and main fuel circuits, the burners of which are designed to open at different operating pressures.

U.S. Pat. No. 544,922 describes an arrangement which includes a sequence valve that serves to divide the fuel output from a fuel metering unit into main and pilot fuel streams. A torque motor is used to control the position of the sequence valve. The sequence valve, in addition to splitting the fuel into pilot and main fuel streams, also controls the fuel pressure in a signal line which is used to control the operation of the main burners.

All three of the fuel staging systems outlined hereinbefore are still of relatively complex form. It is an object of the invention to provide a fuel staging system of relatively simple and convenient form.

According to the present invention there is provided a fuel staging system comprising a splitter valve arranged to split an input fuel stream into a pilot fuel stream and a main fuel stream, the splitter valve comprising a spool slidable within a bore, the spool and bore together defining first and second control chambers, the fluid pressures in which determine the position occupied by the spool, the system further comprising a control line which, in use, controls fuel delivery through a plurality of main burners, the fluid pressure in the control line being a combination of the fluid pressures in the first and second control chambers.

By using the first and second control chamber pressures to derive the control pressure applied through the control line, it will be appreciated that the fuel staging system is of relatively simple form, the number of control valves, etc, required therein being reduced.

Conveniently, the control line communicates with the first and second control chambers through restricted flow passages. The restricted flow passages may be provided in the splitter valve, for example in the spool thereof.

The input fuel stream is preferably derived from the output of a fuel metering unit.

A control valve is preferably provided to control the relative fuel pressures applied to the first and second control chambers. The control valve is preferably supplied with fuel at a pressure higher than the output pressure of the fuel metering unit.

Preferably, a pump for example in the form of an electrically driven fixed displacement pump or a gear box driven variable displacement pump, is used to supply fuel from the fuel metering unit to the control valve at an increased pressure.

A re-circulation valve is preferably provided to deliver at least part of the main fuel stream into the pilot fuel stream when the main burners are closed. The re-circulation valve is conveniently controlled by the fluid pressure in the control line.

Figure 2:
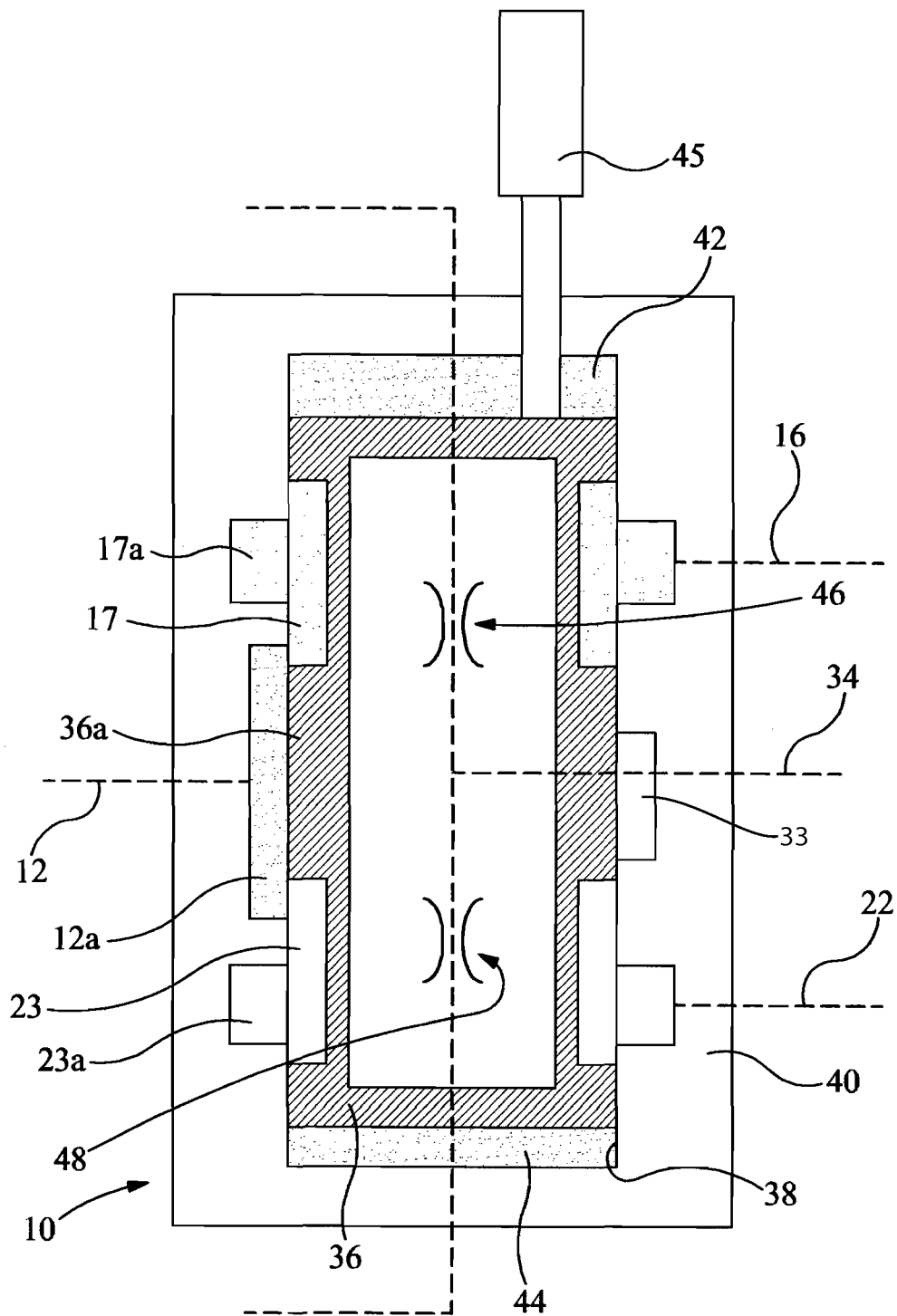

The invention will further be described, by way of example, with reference to the accompanying drawings, in which:

FIG. 1 is a diagrammatic view of a fuel staging system according to one embodiment of the invention; and FIG. 2 is an enlarged view of the splitter valve of FIG. 1.

The fuel staging system illustrated in the accompanying drawings comprises a splitter valve 10 arranged to receive an input fuel stream along an input line 12 from the output of a fuel metering unit (FMU) 14. The splitter valve 10 operates to divide the input fuel stream into a main fuel stream which is delivered along line 16 to a main fuel manifold 18 connected to a series of burners 20, and a pilot fuel stream delivered through a line 22 to a pilot manifold 24, which, again, is connected to the burners 20. Each burner 20 includes a pilot part from which fuel from the pilot manifold 24 is delivered and a main part from which fuel from the main manifold 18 is delivered.

Each fuel burner 20 includes a control valve 26 which is operable to determine whether or not the main part of that burner 20 delivers fuel at any given time. The operation of the control valve 26 is dependent upon the pressure of fuel within a control chamber 28 thereof, the main manifold pressure and upon the force applied thereto by an associated spring 30. In use, when fuel is being delivered to both the main manifold 18 and the pilot manifold 24, and the fuel pressure within the control chambers 28 is low, then the springs 30, in conjunction with the main manifold pressure, will serve to hold the control valves 26 in their closed position, thus fuel is delivered only through the pilot parts of the burners 20, the main parts thereof remaining closed. If the fuel pressure within the control chambers 28 rises to a point sufficient to allow the valves 26 to open, then fuel will be delivered from the main manifold 18 through the main parts of the burners 20 in addition to the continued supply of fuel from the pilot manifold 24 through the pilot parts of the burners 20. It will be appreciated that by appropriate sizing of the springs 30, the valves 26 of the burners 20 can be arranged to open when the control chambers 28 are at different pressures, thus the delivery of fuel through the main parts of the burners 20 can be sequenced.

The control chambers 28 are each connected to a control manifold 32 which, in turn, is connected via a control line 34 to the splitter valve 10.

As best shown in FIG. 2, the splitter valve 10 comprises a spool 36 slidable within a bore 38 formed in a housing 40. The bore 38 and spool 36 together define a first control chamber 42 and a second control chamber 44. It will be appreciated that the axial position occupied by the spool 36 is dependent upon the relative fuel pressures within the first and second control chambers 42, 44. Thus, if it is desired to move the spool 36 in an upward direction, the fuel pressure within the second control chamber 44 is increased relative to that within the first control chamber 42. Similarly, in order to move the spool 36 in a downward direction, the relative pressures of the first and second control chambers 42, 44 are adjusted such that the first control chamber 42 will be at a pressure higher than that of the second control chamber 44. The splitter valve 10 includes an inlet port 12a in communication with the line 12, and the spool 36 includes a land 36a positioned so as to lie adjacent the port 12a. To one side of the land 36a is defined a pilot port 23 which communicates via a port 23a in the housing 40 with the line 22 and pilot manifold 24. To the other side of the land 36a is defined a main port 17 which communicates via a port 17a in the housing 40 with the line 16 and main manifold 18. FIG. 2 illustrates the splitter valve 10 in a position in which more of the annular area of the pilot port 23 is open to the inlet port 12a than the annular area of the main port 17 that is open to the inlet port 12a. Consequently, a greater proportion of the fuel supplied from the FMU 14 along the input line 12 is delivered to the pilot manifold 24 via the line 22 than is delivered to the main manifold 18 via the line 16. When the spool 36 is moved in a downward direction, then a greater proportion of the fuel from the line 12 is delivered to the main manifold 18 via the line 16, the supply of fuel to the pilot manifold 24 via the line 22 being reduced. A particular feature of the splitter valve 10 is that it provides pilot and main burner flow split in discrete ratios as required for a particular application. These discrete ratios are achieved by discrete positioning of the spool 36 in the bore 38. Furthermore, it is recognised that the number, location and relative sizing of the lands and ports in the splitter valve 10 can be altered to provide different fuel delivery options for different staged combustion arrangements. For example, there could be more than one main port providing split delivery to additional main manifolds.

The position of the spool 36 is monitored by a position sensor 45.

It is well known that there is a need to improve the accuracy of fuel staging systems, when compared with conventional fuel systems, in order to optimise the performance of the engine at all operating conditions. This improvement can be achieved with a simplified arrangement of valves and a discrete positioning splitter valve as described hereinbefore. By contrast, the arrangement described in, for example, U.S. Pat. No. 5,881,550 is significantly more complex and includes a proportional control type shuttle valve that is inherently less accurate than a discrete valve.

As illustrated in FIG. 2, the spool 36 is provided with restricted flow passages 46, 48 providing restricted flow connections between the control line 34 and both the first control chamber 42 and the second control chamber 44 via a control port 33 in the housing 40. The fuel pressure applied to the control chambers 28 of the control valves 26 is thus a combination of the fuel pressures applied to the first and second control chambers 42, 44.

Referring to FIG. 1, a control arrangement 50 is provided to control the operation of the splitter valve 10. The control arrangement 50 comprises a supplementary pump 52 arranged to receive fuel from the output of the fuel metering unit 14, outputting fuel at an increased pressure to a line 54. A pressure transducer 56 is arranged to monitor the fuel pressure in the line 54. The supplementary pump 52 may comprise, for example, an electrically driven fixed displacement pump, the operating speed of which can be controlled to determine the pressure in the line 54, or a gearbox driven variable displacement pump, the operation of which can be controlled to achieve the desired pressure in the line 54.

A control servo valve 58 delivers fuel from the line 54 to first and second control lines 60, 62 connected, respectively, to the first and second control chambers 42, 44 of the splitter valve 10. It will be appreciated that, in use, the servo valve 58 is used to control the pressures applied to the first and second control chambers 42, 44, and thus that the servo valve 58 operates to control the position occupied by the splitter valve 10. Further, the servo valve 58 in combination with the operation of the additional pump 52 serves to control the combined fuel pressure applied to the first and second control chambers 42, 44, and hence the pressure within the control line 34 which is applied to the control chambers 28 of the burners 20.

The fuel staging system further comprises a re-circulation valve 64 which is operable to allow fuel from the main manifold 18 to be delivered to the pilot manifold 24 when the control valves 26 are closed and hence fuel from the main manifold 18 is not being delivered through the main parts of the burners 20. The re-circulation valve 64 comprises a valve member 66 engageable with a seating such that, when the valve member 66 engages its seating fuel from the main manifold 18 is not permitted to flow to the pilot manifold 24, movement of the valve member 66 away from its seating permitting such flow. The valve member 66 is biased by a spring 68 away from its seating, and a surface of the valve member 66 is exposed to the fuel pressure within the control chamber 28 of one of the burners 20 and 50 connected to the manifold 32, thus when the manifold 32 is at low pressure and the valves 26 are closed, the re-circulation valve 64 will be open and fuel from the main manifold 18 will be delivered to the pilot manifold 24. When the fuel pressure within the manifold 32 increases to a level sufficient to allow fuel delivery via the main parts of the burners 20, then the increase in manifold pressure will result in the re-circulation valve 64 closing, terminating the delivery of fuel from the main manifold 18 to the pilot manifold 24.

A line 72 connects the control chamber 70 via restriction 74 to the inlet line 12.

In use, as described hereinbefore, the splitter valve operates to determine the proportion of fuel delivered to the main manifold 18 and the proportion delivered to the pilot manifold 24. Fuel from the pilot manifold 24 is delivered by the burners 20. If the fuel pressure within the control manifold 32 is low, then the control valves 26 will be closed thus fuel from the main manifold 18 is not delivered directly via the main parts of the burners 20, but rather the fuel is re-circulated via the re-circulation valve 64 to the pilot manifold 24 from where it is delivered by the burners 20. The re-circulation of fuel from the main manifold 18 to the pilot manifold 24 via the valves 26 ensures that the correct quantity of fuel is delivered to the engine, and that the temperature of fuel in the main manifold 18 and valves 26 is maintained at a low enough level to reduce the risk of fuel lacquering/degradation which can have an impact on the performance of the fuel staging system.

By appropriate control of the supplementary pump 52, the fuel pressure in the control manifold 32 can be increased to open one or more of the valves 26 with the result that fuel from the main manifold 18 is injected through the main parts of one or more of the burners 20. The increase in the control manifold pressure results in the re-circulation valve 64 closing as the first of the control valves 26 opens. As mentioned hereinbefore, by appropriate selection of the rates of the springs 30, the control valves 26 may be arranged to open in sequence. In order to ensure that fuel in the main manifold 18 flows continuously, the last of the burners 20 in the direction of fuel flow through the manifold 18 is conveniently the first to open.

Throughout the operation of the fuel staging system, fuel from the control manifold 32 re-circulates via the line 72 and restrictor 74 to the upstream side of the splitter valve 10, ensuring that the temperature of the fuel in the control manifold 32 and control chambers 28 is maintained at a low enough level to reduce the risk of fuel lacquering/degradation.

It is noted that the combination of the fuel flow from the supplementary pump 52 and the restrictor 74 ensures that the pressure within the control line 34, which is applied to the control chambers 28 of the burners 20, is maintained at a higher level than the pressure in the line 12 from the output of the fuel metering unit 14.

It is also noted that if the supplementary pump 52 fails, the pressure in the control line 34 and the control chambers 28 will fall, resulting in closure of the control valves 26 and cessation of the fuel flow to the main parts of the burners 20. Fuel flow will be maintained to the pilot parts of the burners 20 as described hereinbefore, to maintain the necessary level of safe engine operation and subsequent engine shutdown.

On engine shut down, each manifold is drained to avoid temperature soak into the fuel.

It is known that the various valves and fuel lines of the fuel staging system described hereinbefore are located in the high temperature core zone of the engine and hence in order to reduce the risk of fuel lacquering/degradation, there is a need to either maintain fuel flow through these components at all times during engine operation or ensure that fuel is drained from the components on engine shut down as described hereinbefore.

It will be appreciated that the fuel staging system described hereinbefore is of relatively simple form, requiring relatively few components compared to typical arrangements and control being achieved simply by control over the operation of the supplementary pump 52 and the servo valve 58, these components serving to control both the split between the delivery of fuel to the main manifold 18 and pilot manifold 24 and also controlling the delivery of fuel through the main parts of the burners 20.

It will be appreciated that a range of modifications and alterations may be made to the arrangement described hereinbefore without departing from the scope of the invention.

The invention claimed is:

1. A fuel staging system comprising a splitter valve having an inlet port, a main outlet port and a pilot outlet port, the splitter valve being operable to split an input fuel stream supplied to the inlet port from a metering unit into a pilot fuel stream delivered through the pilot outlet port to a plurality of pilot and a main fuel stream delivered through the main outlet port to a plurality of main burners, the splitter valve comprising a spool slidable within a bore, the position of the spool controlling the proportion of the input fuel stream delivered to the pilot outlet port and the proportion delivered to the main outlet port, the spool and bore together defining first and second control chambers the fluid pressures in which determine the position occupied by the spool, and so controlling the split of the input fuel stream between the pilot and main fuel streams; and a control line, the fuel pressure within, which controls the operation of the main burners, to control fuel delivery through the main burners, the fluid pressure in the control line being a combination of the fluid pressures in the first and second control chambers;

wherein a control valve is provided to control the relative fuel pressures applied to the first and second control chambers; and wherein the control valve is supplied with fuel at a pressure higher than the output pressure of the fuel metering unit.

2. A system according to claim 1, wherein the control line communicates with the first and second control chambers through restricted flow passages.

3. A system according to claim 2, wherein the restricted flow passages are provided in the splitter valve.

4. A system according to claim 1, wherein a pump is used to supply fuel from the fuel metering unit to the control valve at an increased pressure.

5. A system according to claim 1, wherein a re-circulation valve is provided to deliver at least part of the main fuel stream into the pilot fuel stream when the main burners are closed.

6. A system according to claim 5, wherein the re-circulation valve is controlled by the fluid pressure in the control line.

* * * * *